INVENTORS
HAROLD J. PRICE
ROBERT E. JONES JR.
BY Anderson, Spangler & Wymore
ATTORNEYS United States Patent Office 3,431,416
Patented Mar. 4, 1969

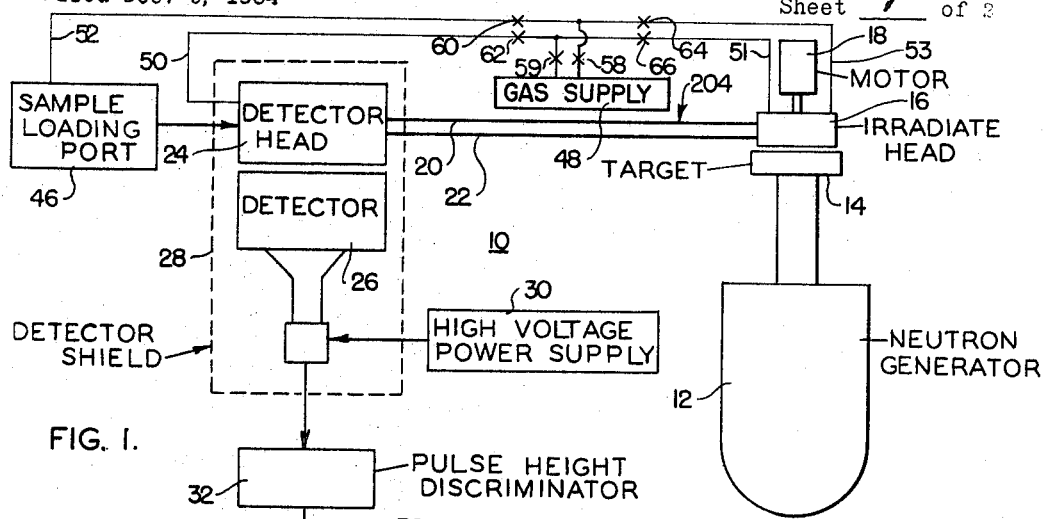
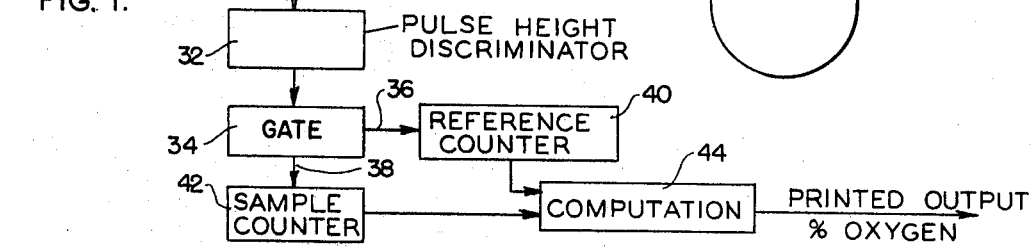
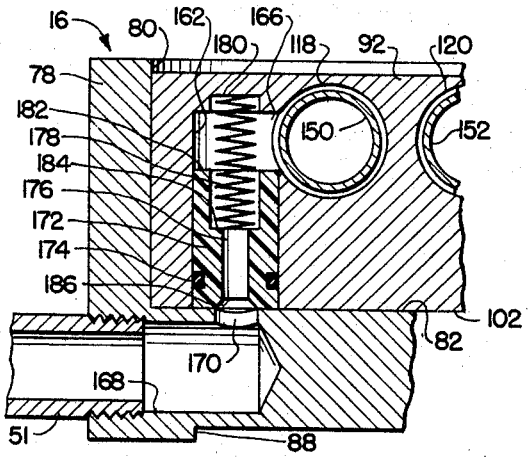
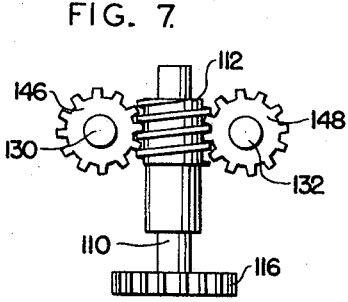
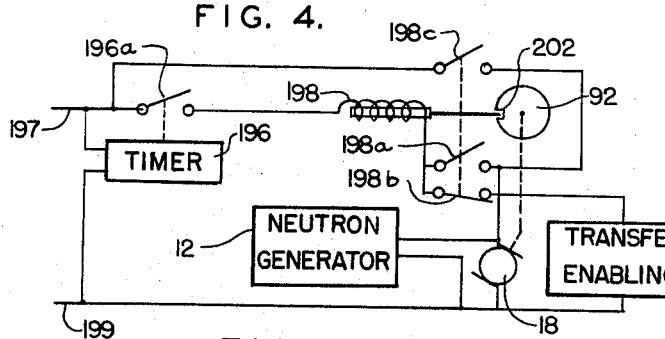

3,431,416
METHOD AND APPARATUS FOR AUTOMATIC NEUTRON ACTIVATION ANALYSIS COMPRISING SIMULTANEOUS ROTATION OF A KNOWN AND AN UNKNOWN SAMPLE
Robert E. Jones, Jr., Colorado Springs, Colo., and Harold J. Price, Albuquerque, N. Mex., assignors to Kaman Corporation, a corporation of Connecticut
Filed Dec. 9, 1964, Ser. No. 417,118
U.S. Cl. 250—83.3                  19 Claims
Int. Cl. G01t 1/16, 3/00; H01j 39/32

ABSTRACT OF THE DISCLOSURE

Method and apparatus for automatic neutron activation analysis which provides for the simultaneous rotation of a known and an unknown sample each about two axes wherein the two axes of rotation of each sample are of non-coplanar relation during irradiation to provide for the uniform irradiation of both the known and unknown sample.

---

Activation analysis is a by-product of the nuclear age and in many respects is a relatively new method of analysis which requires refinements to produce best results. Activation analysis can be applied to the determination of many unknowns with great increase in speed and efficiency and greatly increased sensitivity. Many analyses are carried out for trace-level impurities in high purity silicon and germanium for semi-conductors. It is used to determine the exact values of dopants concentrations in finished semiconductors and further to record trace impurities in high purity beryllium, aluminum, and graphite and for traces of oxygen in lithium, sodium, potassium, cesium, beryllium, niobium, steel and titanium to mention only a few.

The petroleum and chemical industries find activation analysis to be the best technique to analyze plastics for deleterious traces of catalyst residues; catalytic cracking unit feedstocks for vanadium and other harmful trace metals; platformer feed stocks for even parts per billion levels of arsenic; minute samples of newly synthesized compounds to establish their formulas; and partially oxidized hydrocarbons for their oxygen contents.

In the field of agriculture, activation analysis is used to determine bromide residues in crops and foodstuffs resulting from the use of bromine-containing mematocides in soil fumigations and of methyl bromide in the fumigation of wheat and corn storage. Organochlorine insecticides in food materials can be detected down to fractions of a p.p.m. in hydrocarbon extracts of food materials. Also wheat illegally contaminated with seed wheat containing bromide residues can be spotted easily with neutron activation analysis.

Activation analysis is also finding an important use in the crime detection laboratories. Evidence samples too small to be analyzed by other methods can be analyzed by activation analysis. Samples of paint, glass, tire rubber, automobile grease, and other materials can be traced to the manufacturer via trace element impurities. Gun shot residues on the hand or face of a suspect can be found with high reliability, detecting microgram and submicrogram amounts of barium and antimony from the cartridge primer. Criminalists also have used activation analysis to match hair samples by means of their trace-element concentrations.

Activation analysis provides a means of sensitively, rapidly, accurately, and quantitatively determining as many elements as possible in as large a number of matrices as possible. Activation analysis is highly sensitive and fast. Since it is a nuclear method, activation analysis is totally independent of the chemical form, or forms, and valence state, or states, of the elements present in the sample.

Sensitivity is probably the most important asset of activation analysis. For example, under the slow neutron flux conditions of a modern reactor—$10^{13}$ neutrons per cm.$^2$-sec. and a maximum irradiation time of one hour—the sensitivity shows detection limits ranging from as low as $10^{-7}$ to $10^{-6}$ microgram ($\mu$u) to as high as 1 to 10 $\mu$g., with a median sensitivity of $10^{-3}\mu$g. High flux neutron activation analysis is the most sensitive method known for more than half of the elements of the periodic system since even relatively large samples up to 10 grams or more can be analyzed with sensitivities in the range of parts per billion being commonplace.

The elements oxygen and nitrogen particularly can be determined sensitively by activation with fast neutrons. Fast neutrons with kinetic energies of a few million electron volts are not simply captured by nuclei as in the case of slow neutrons. Instead, they eject one or two particles from the struck neucleus—a proton, alpha particle, or two neutrons—and form different radioactive products.

Activation analysis comprises bombarding a sample of the material to be analyzed with nuclear particles to convert some of the atoms into isotopes. Often the isotopes are radioactive and by carefully measuring the various induced radioactivities, the chemistry of the material can be determined. The bombarding particles can be neutrons; energenic charged particles such as protons, deuterons, and alpha particles or high energy photons. Since the most useful and widely used particle for activation analysis is the neutron, the present invention will be illustrated using neutrons as the bombarding radiation.

It is the principal object of the present invention to provide a new and novel method of activation analysis and the apparatus for practicing the method.

A further important object of the present invention is to provide an improved method of activation analysis including the provision of a substantially uniform irradiation of the materials under treatment.

A further object of the present invention is to provide an improved activation analysis apparatus including a rotatable sample irradiation head.

A still further object of the present invention is to provide a novel process of activation analysis including the step of irradiating a known and an unknown sample with a uniform amount of radiation.

Another and further object of the present invention is to provide improved activation analysis apparatus including a sample holding head which rotates the samples about a plurality of axes.

A still further object of the present invention is to provide an improved method of activation analysis which includes the step of removing all samples from the immediate influence of the source of irradiation at the end of the irradiation interval.

A further object of the present invention is to provide an improved activation analysis method and apparatus which is both accurate, efficient, simple of construction and relatively economical.

For a better understanding of the present invention, together with other and further objects thereof, reference is had to the following description taken in connection with the accompanying drawing and its scope will be pointed out in the appended claims.

In the drawings, FIGURE 1 is a block diagram of an activation analysis system embodying the present invention;

FIGURE 4 is a view along line 4—4 of FIGURE 2;

FIGURE 5 is a view of the gearing arrangement for rotating the sample holding tubes of the irradiate head according to the present invention;

FIGURE 6 is a representation of the electrical circuit of the irradiate head and irradiation source according to the invention; and, FIGURE 7 is a view in elevation of the capsule in which unknown and reference samples are carried in the system of the present invention.

Figure 2:
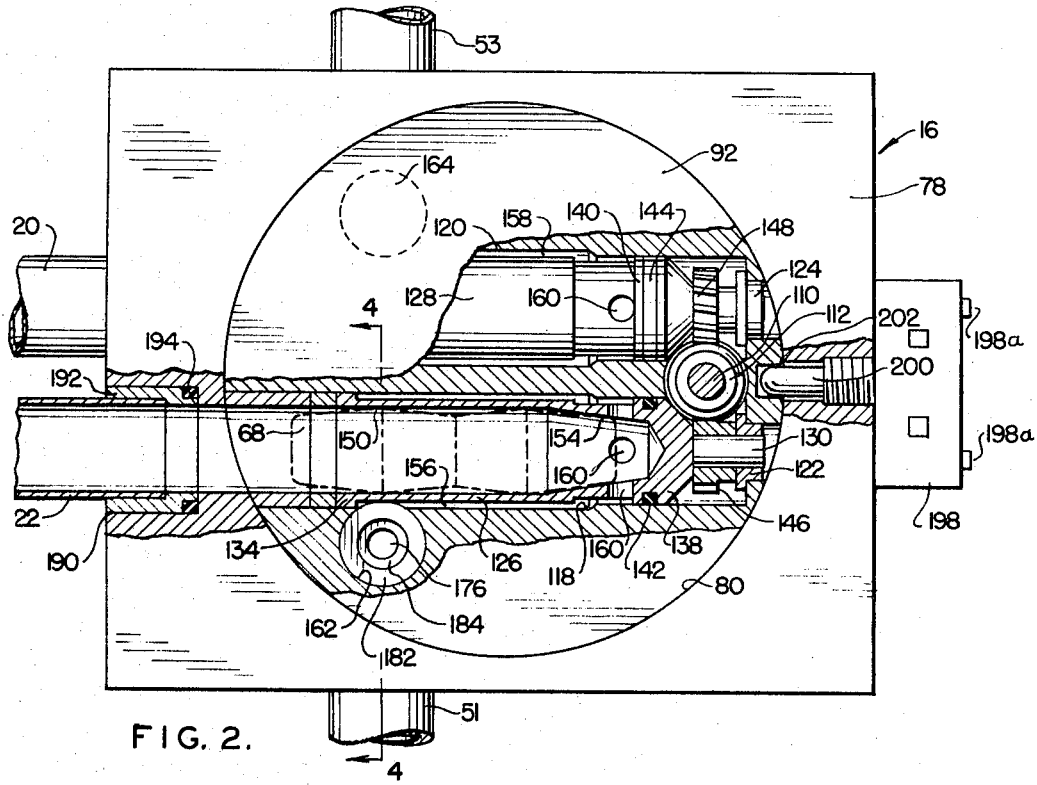
FIGURE 2 is a plan view, partly in section, of the novel sample holding irradiate head according to the invention.
Figure 3:
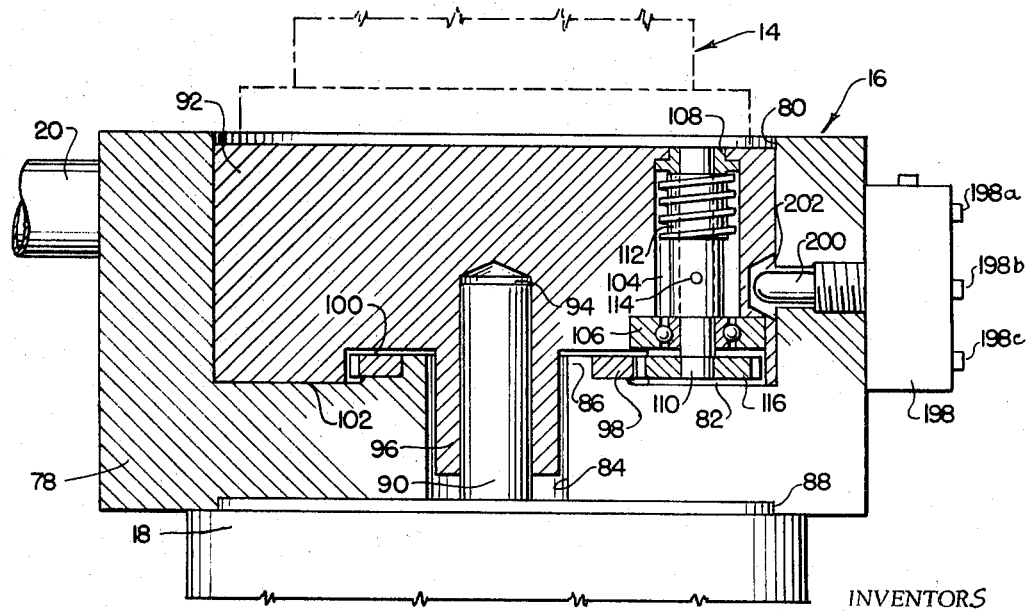
FIGURE 3 is a view in elevation and partly in section of the irradiate head of FIGURE 2 with parts broken away to conserve space.

The system described herein makes use of the partial transmutation of $O^{16}$ to $N^{16}$ when bombarded by high energy neutrons. The $N^{16}$ is an unstable isotope which decays back to $O^{16}$ and in the process emits characteristic gamma and beta radiation with a half life of approximately 7.4 seconds. Thus it becomes practical to nondestructively determine the amount of oxygen in a substance by irradiating the substance with high energy neutrons and measuring the amount of radiation emitted by the transmuted oxygen. The amount of transmuted oxygen is directly proportional to the quantity of oxygen originally present.

In accordance with the present invention, the novel process comprises the steps of simultaneously irradiating a plurality of samples of a material with high energy nuclear particles where at least one of the samples contains an unknown amount of a transmutable material and another sample is one containing a known amount of the said material, moving said samples during irradiation in a manner to produce an essentially uniform irradiation of the samples, transferring said samples in predetermined timed sequence to a radiation detection means and counting the radiation emanating from the samples over a predetermined time interval.

In activation analysis each stable-isotope species in a sample that undergoes a nuclear reaction to form a radioactive isotope follows the basic equation $$Ao = Nf\sigma S \qquad (1)$$

where:

$Ao$ is the disintegration rate of the radioactive species produces;

$N$ is the number of stable "target" nuclei that can form that radioisotope;

$f$ is the particle "flux" bombarding the sample;

$\sigma$ is the effective cross-sectional area per nucleus for the reaction; and, $S$ is the saturation term, dependent on the length of irradiation.

A simple proportion from Equation 1 is developed that is used in actual practice. With the proportion it is not necessary to measure the disintegration rate $Ao$. Instead, the counting rate of the particular induced activity of interest in the activated sample is measured. When a sample or series of samples is to be analyzed for a particular element, a standard or known sample of that same element is activated and counted in exactly the same way as the unknown sample or samples. Thus, at any given decay time, the unknown weight of the element in the sample can be calculated by the following proportion:

$$\frac{\text{Counting rate of sample}}{\text{Counting rate of standard}} = \frac{\text{Wt. element in sample}}{\text{Wt. element in standard}} \qquad (2)$$

Equation 2 eliminates the necessity of knowing exact values of the counting efficiency, the irradiation flux, the reaction cross-section, and the irradiation time so long as these are identical for both the sample and the standard.

Counting is usually done with a sodium iodide scintillation counter that is coupled to a multichannel pulse-height analyzer which rapidly measures the size of each amplified counter output electrical pulse in millivolts and stores it, as a count of that size, in an electronic memory.

At the end of the counting period the pulse height spectrum of the activated sample and standard are compared to provide information on the amount of the element in the sample. By comparing the measured photopeak height or area of the sample with that of the standard, corrected to the same decay time, the element's weight can be calculated from the proportion expressed in Equation 2 above.

Referring now to FIGURE 1, there is shown a block diagram of a system 10 according to the present invention optimized for oxygen determination. There is provided a source of nuclear radiation in the form of a neutron generator 12 having target 14. An irradiate head 16 is positioned in close proximity to the target 14. A motor 18 is operatively connected to head 16 to rotate the samples during the irradiation period as will be more fully described as the description progresses. The irradiate head connects pneumatic transfer tubes 20 and 22 which are connected to a detector head 24. The detector head and detector 26, which may be a sodium iodide scintillation crystal are enclosed within a radiation shielding 28, shown dotted, along with a high voltage supply 30 for the detector. The output from the detector head feeds a pulse height discriminator 32, and the output thereof is fed into a gate 34. The gate 34 has two outputs 36 and 38 for selectively feeding an output from the pulse height discriminator to the reference counter 40 or the sample counter 42 depending on whether the standard reference or sample is being counted by the detector. The counts accumulated in reference counter 40 and sample counter 42 are compared in computation means 44 having an output proportional to the percentage of oxygen in the sample which may be fed to a printer and printed. A sample loading port 46 is provided through which a sample containing an unknown amount of oxygen or other selected unknown is introduced into the system. The reference sample is retained in the detector head from a previous run. Of course where an analysis for a material other than oxygen is made, a different reference sample is provided in the system and means, not shown, are provided for insertion and removal of the standard samples. Air from air supply 48 is supplied via air supply lines 50 and 52 respectively to the detector head to transfer the reference sample and the unknown sample to the irradiate head respectively via transfer tubes 20 and 22, the unknown sample passing from the sample loading port 46 to the detector 24 and thence to the irradiate head 16. When the samples are transferred to the irradiate head, the air ahead of the samples is allowed to bleed off through gas supply lines 51 and 53 through opening and closing of suitable valves 58, 60, 62, 64 and 66. The samples are contained in a plastic capsule 68 shown dotted in FIGURE 2, of shape which provides a pneumatic seal with the transfer tube and permits the capsule to proceed through gentle curves in the tube. It is seen that each end 69 of the capsule 68 is provided with a tapered outer portion 70 and a tapered inner portion 72. Each of these portions appear as a truncated right cone having their bases joined as at 74. The ends 69 are hollow and are joined at the small end of one tapered portion as at 76 as by telescoping. The large portions of the capsule 68 as at 74 are of a diameter to provide a close but sliding fit with the inside diameter of the transfer tubes 20 and 22. Thus it will be seen that the capsule 68 will traverse a curve in the transfer tube which does not exceed a minimum radius less than a radius accommodated by the tapered ends of the capsule and maintain a pneumatic seal with the tube.

With the capsules 68 containing an unknown and a reference sample positioned in the irradiate head 16, the neutron generator 12 is actuated, preferably for a predetermined time interval. During the activation interval the irradiate head and the contained capsules of samples are rotated about an axis in alignment with the shaft of motor 18 and preferably also about an axis of symmetry of the capsule 68. At the end of the irradiation interval, the capsule containing the unknown sample is ejected from irradiation head 16 and propelled through transfer tube 22 into position in detector head 24. The detector 26 is energized and gate 34 is switched to direct the output of pulse height discriminator 32 into sample counter 42 where it is stored. Following the unknown detect interval which is preferably of predetermined duration, the capsule containing the reference sample is ejected from the irradiate head 16 and propelled to the detector head 24 via transfer tube 20. At the same time and by suitable manipulation of valves 58–66, the unknown sample capsule is ejected from the detector head 24 into position at the sample loading port 46 for removal. The sample loading port is sufficiently removed physically from the detector head to prevent any pick up of radiation from the unknown by the detector heads. Following the initiation of ejection of the reference sample from the irradiate head, an interval of time is allowed to elapse which is greater than the maximum transfer time of the reference sample into the detector head before a count is started on the reference sample. After this time interval has elapsed, the detector 26 is energized for the requisite time interval and gate 34 is switched to connect the output of the pulse height discriminator 32 to reference counter 40 where it is stored. On command the stored counts in sample and reference counters are fed into a computation means 44 where the count from the unknown sample is compared with the count of the reference sample corrected to the same decay time and develops an output proportional to the percentage of unknown element in the sample being tested. The unknown sample being at the sample loading port can or has been removed and the system is ready to receive another unknown. The only prerequisite being that there has been an elapse of time since the irradiation of the reference sample greater than the half-life of the isotope of the element being analyzed for. Since this is usually a relatively short period, in many cases, the system is immediately ready for the next determination.

Reference will now be made to FIGURES 2–6 wherein detailed consideration is given to the irradiate head 16. The irradiate head is seen to comprise a casing 78 provided with a circular recess 80 having a bottom 82. Centered in the bottom of recess 80 is an opening 84 through casing 78. Raised from the bottom 82 and surrounding opening 84 is a boss 86. Casing 78 is provided with another recess 88 opposite recess 80 and aligned therewith within which a portion of motor 18 is received with the shaft 90 thereof passing up through opening 84 in the bottom of recess 80. A circular portion 92 is rotatably mounted in opening 80 and is provided with a bore 94 which receives the shaft 90 of motor 18 in press fit relation to rotate therewith. The circular portion 92 is provided with a central cylindrical extension 96 which is received within opening 84 and provides a sleeve for receiving shaft 90.

The boss 86 supports a ring gear 98 thereabout and circular portion 92 is provided with an annular recess 100 in the bottom which accepts boss 86 and gear 98. The bottom 102 of circular portion 92 and the bottom 82 of casing mate in quite close relation where they meet. The circular head portion 92 has a stepped bore 104 in alignment with but radially spaced from its axis of rotation. The larger diameter portion of bore 104 receives and mounts a ball bearing 106 while the opposite end of the bore 104 mounts a sleeve bearing 108. Bearinged in bearings 106 and 108 is a shaft 110 having a worm gear 112 positioned between the bearings and secured to shaft 110 as by a pin 114. Shaft 110 has a spur gear 116 fastened to the lower end thereof meshing with ring gear 98. Thus when motor 16 is energized, the movement of circular head portion 92 will rotate shaft 110 through ring gear 98 and spur gear 116.

Referring now to FIGURES 2 and 4 in particular it will be seen that circular head portion 92 is provided with two additional bores 118 and 120, which are in side-by-side spaced parallel relation with each lying to either side of the axis of rotation of the circular portion 92 but the axes of bores 118 and 120 lie in the same radial plane. Bores 118 and 120 are provided with a stepped down portion near one end receiving a sleeve bearing 122 and 124 respectively. Each of the bores 118 and 120 receive a rotatable insert 126 and 128 respectively. The inserts are provided with an axially aligned shaft 130 and 132 at one end journalled respectively in bearings 122 and 124. The other end of the inserts have enlarged diameter portions 134 and 136 which are journalled respectively within bores 118 and 120. A journaling of the inserts is also accomplished adjacent the other end by means of further enlarged diameter portions 138 and 140. Portions 138 and 140 are provided with a seal 142 and 144 of resilient material to prevent passage of air therebeyond. Gears 146 and 148 are fixedly mounted on shafts 130 and 132 and mesh with worm gear 112. The interiors of inserts 126 and 128 are provided with bores 150 and 152 sized to receive capsules 68 and terminating at the ends mounting shafts 130 and 132 with tapered sections 154, the taper of which mates with the tapered ends 70 of capsule 68.

Intermediate the enlarged outside diameter portions 134 and 138 of insert 126 and portions 136 and 140 of insert 128, the inserts are of smaller diameter than bores 118 and 120 respectively providing spaces 156 and 158 therebetween respectively. The inserts 126 and 128 are provided with a plurality of bores 160 through the walls of the tapered portions providing communication between the interior of the inserts and the respective spaces 156 and 158 via bores 160. Bores 160 are located near the end of the tapered sections 154 so as to communicate with the interior beyond the end of capsule 68 when the end thereof is received in mating relation to the tapered section 154 of inserts 126 and 128.

Referring to FIGURE 4 and FIGURE 2, the circular head portion 92 is provided with a pair of bores 162 and 164 opening onto bottom 102 thereof and terminating short of the top but provided with a port 166 communicating bores 162 and 164 with spaces 156 and 158 respectively. With the circular head portion 92 in the indexed position as shown, there are provided bores 168 in casing 78 at right angles to bores 162 and 164 and provided with threads to threadably receive air pipes 51 and 53. Bores 168 are each provided with a bore 170 communicating a bore 168 respectively with a bore 162 and 164. A sealing plug 172 is provided in each bore 162 and 164. Plug 172 is of plastic, such as nylon and the like and is provided with a sealing ring 174 of resilient material within a groove on the outer surface thereof. Plug 172 is provided with an axial bore 176 therethrough, the lower end of whch is flared out to the same diameter as bore 170 connecting bore 168. At the upper end of plug 172, the bore is of a larger diameter and receives one end of spring 178 which has the other end received within a depression 180 at the top of bore 162. Spring 178 lightly biases plug 172 into contact with the bottom 82 of recess 80 in casing 78. When air under pressure is introduced into bore 162, the areas presented on top 182 and shoulder 184 are considerably greater than the effective area of the bottom as represented by the tapered portion 186, and plug 172 is forced into sealing relation with bottom 82 of the recess.

Casing 78 is also provided with another pair of bores 190 in alignment with bores 118 and 120 in the circular head portion 92 when in the indexed position as shown. Transfer tubes 20 and 22 are connected to casing 78 by fittings 192 received within bores 190 and provided with a ring 194 of resilient material to provide an air tight seal between fitting 192 and the casing.

Reference is now made to FIGURE 6 which illustrates one form the head rotation circuitry may take. Power is supplied from a current source, not shown, to a timer 196 via conductors 197 and 199. The sample capsules 68 are positioned within head 16 in the manner previously indicated. The timer 196 is set to a predetermined time setting and energized to close timer switch 196a. With switch 196a closed, power is fed to solenoid 198 retracting plunger 200 from the indexing detent 202 in the peripheral surface of circular head portion 92, see FIGURES 2 and 3. Plunger 200 is operatively connected to normally-open switch contacts 198a and normally-closed switch contacts 198b. When solenoid 198 is actuated, contacts 198b open, disabling the transfer system preventing the introduction of compressed air to head 16 via conduits 51 and 53. At the same time contacts 198a close energizing motor 18 and the neutron generator 12. Solenoid 198 is provided with another pair of normally-open contacts 198c which shunt the timer switch and connect the power source via conductor 197 to the motor 18. Once the solenoid is actuated it will continue to be actuated and actuate motor 18 through contacts 198a. If the timer runs out and head portion 92 is not indexed, motor 18 will continue to be actuated through contacts 198c until plunger 200 is again received in detent 202. In this position the transfer system is enabled. During the irradiation period determined by the setting of timer 196 plus any overrun by motor 18, which may be of the synchronous type, the sample capsules are rotated about their axis of symmetry through ring gear 98, spur gear 116, worm gear 112 and gears 146 and 148 which rotate inserts 126 and 128. Thus the samples are given two distinct degrees of rotation within the field of flux emanating from target 14 of neutron generator 12.

Compressed gas is introduced from gas supply 48 through conduit 51 into the space 156 and thence through ports 160 ejecting capsule 68 containing an unknown sample from the irradiate head and along transfer tube 22 to the detector head 24. By means of a suitable sensing means, such as a photocell and the like, the arrival of the sample at the detector is determined whereupon the air supply to conduit 51 is turned off and further progress of the capsule is stopped. A stop means, such as a pin and the like, may be positioned across the transfer tube in responding to a signal from the photocell. The signal from the photocell may also be used to initiate the predetermined counting interval of the unknown. After the counting interval has elapsed, air is again introduced into conduit 51 ejecting the capsule containing the unknown sample to the sample loading port 46. At the same time gas is also introduced into conduit 53 transferring the reference sample to the counting head where its arrival is sensed in a like manner and a predetermined counting interval initiated.

While the neutron generator is deenergized after expiration of the irradiation time interval, there will not be an immediate termination of the production of neutrons. If the reference sample remains in the irradiation head, there is always the chance that the reference sample will be subjected to a different amount of radiation than the unknown sample. To avoid this a stop 204 is positioned in transfer tube 20 at a point sufficiently removed from irradiate head 16 to avoid further irradiation. In this case gas is introduced from supply 48 into both conduits 51 and 53 and the capsule containing the reference sample is stopped by stop 204 in tube 20 sufficiently short of detector head 24 to avoid any interference with the count of the unknown sample. Stop 204 may be actuated in response to the interruption of a light beam directed to a photocell and the like and be deactuated at the end of the counting interval for the unknown sample to permit transfer of the reference for counting.

It will be appreciated that several variations and modifications can be made in the system. For example, the detection head 24 could be a rotating head similar to that disclosed for irradiate head 16 to provide greater uniformity in the counting operation. A count head could also be used which provides but a single axis of rotation.

While the present method and apparatus are applicable to the analysis of many elements, there are several distinct features which make oxygen analysis by fast neutron activation a very desirable tool. Use is made of the partial transmutation of $O^{16}$ to $N^{16}$ when bombarded with high energy neutrons. The $N^{16}$ is an unstable isotope which decays back to $O^{16}$ and in the process emits relatively high energy gamma radiation (6–7 mev.) with a half-life of approximately 7.4 seconds. This short half-life allows a complete analysis in approximately one minute and the high energy of the radiation makes it possible to determine oxygen content regardless of the matrix involved.

In any activation analysis system there exist potential sources of error. The statistical error is a natural phenomena that is always present. To keep the statistical error low the neutron flux should be kept high by placing the sample as close into the target as possible; the transfer should be as short as possible; and, the detector efficiency kept high by placing the sample as close to the detector as possible. The effect of transfer and irradiation time variation can be virtually eliminated by use of a reference sample, as contemplated in the instant method and one which preferably is the same geometrical size and shape as the unknown sample.

Mathematically, the average number of counts detected from an unknown sample will be:

$$\text{Nave (Sample)} = \frac{G_s A F}{W} \times \frac{\alpha}{\lambda}(1 - \epsilon^{-\lambda t_i}) \times \epsilon^{-\lambda t}T \times (1 - \epsilon^{-\lambda t_s}) \times \int_s \beta_1(s) \times \phi_1(s) ds$$

(3)

where:

$\beta_1'(s)$ = detector efficiency as a function of space inside a sample
A = Avagardro's number = $6.023 \times 10^{23}$ atoms/cm.$^3$
$\phi_1(s)$ = neutron flux as a function of space inside a sample
F = fractional percentage present of isotope
$G_s$ = weight of element in the sample per unit volume
$t_s$ = sample detection time $t_i$ and $t_T$ = irradiation and transfer times
$\lambda = .693$/half life
$\epsilon$ = naperian base
$\alpha$ = activation cross section (cm.$^2$) of isotope
W = atomic weight of isotope The average number of counts detected from the reference will be:

$$\text{Nave (Ref)} = \frac{G_R A F}{W} \times \frac{\alpha}{\lambda}(1 - \epsilon^{-\lambda t_i}) \times \epsilon^{-\lambda t_d} \times \epsilon^{-\lambda t_T} \times (1 - \epsilon^{-\lambda t_R}) \times \int_s \beta_2(s) \times \phi_2(s) ds$$

(4)

where:

$\beta_2(s)$ = detector efficiency as a function of space inside the reference
$\phi_2(s)$ = neutron flux as a funtion of space inside the reference
$G_R$ = weight of elements in the reference per unit volume
$t_d$ = time greater than the greatest reference transfer time
$t_R$ = reference detection time Now if a ratio is taken between the average sample counts and the average reference counts, the result will be:

$$\frac{\text{N ave (Sample)}}{\text{N ave (Reference)}} = \frac{G_s}{G_R} \times \frac{(1-\epsilon^{-\lambda t_S})}{\epsilon^{-\lambda t}d \times (1-\epsilon^{-\lambda t}R)} \times \frac{\int_s \beta_1(s) \times \phi_1(s) ds}{\int_s \beta_2(s) \times \phi_2(s) ds} \quad (5)$$

It can be seen from Equation 5 that the irradiation time ($t_i$) and the sample transfer time ($t_T$) have been eliminated. The other times remaining are all fixed, and thus that part of Equation 5 containing time reduces to a fixed known constant. Actually, by proper adjustment of the times involved, the value of the time term can be adjusted to any desired value. Thus, the value of the fixed known constant can be set to a convenient value. This is true because the half-life of the element of the reference is exactly the same as the half-life of the sample.

The other terms remaining in Equation 5 which can contribute error involves the detector efficiency and neutron flux as functions of space inside the sample and reference. The neutron flux distribution surrounding the target, or source of neutrons is quite variable and non-uniform. This variability can be virtually eliminated by causing the sample and reference to move during irradiation in such a manner with respect to the source of neutrons that they both follow the same spacial path. By so doing, $\phi_1 s$ and $\phi_2(s)$ are equal and the error resulting from non-uniform neutron flux distribution is eliminated. In adidtion to moving the samples in the same spacial path the rotation of the samples about their axis of symmetry at the neutron source provides for the substantially uniform activation of the greatest number of atoms which results in a reduction in the statistical error.

The only remaining terms in Equation 5, which contribute to the overall measurement error, are the detector efficiencies. Since the detector head 24 and detector and detector 26 usualy remain in fixed spacial relationship, $\beta_1(s)$ and $\beta_2(s)$ remain constant but not necessarily equal and, thus, do not change once the detector and detect head are fixed. However, if the sample and reference are made to move at the detector, and follow the same spacial path, then $\beta_1(s)$ and $\beta_2(s)$ will be equal and eliminate the detector efficiency term in Equation 5. In addition to moving the samples in the same spacial path the rotation of the samples about their axis of symmetry provides for the substantially uniform detection of the greatest number of atoms which results in a reduction in the statistical error.

While there have been described what at present are considered to be the preferred embodiments of the invention, it will be obvious to those skilled in the art that various changes and modifications may be made therein without departing from the invention. It is aimed therefore in the appended claims to cover all such changes and modifications which fall within the true spirit and scope of the invention.

We claim:
1. The method of quantitative analysis by nuclear activation which comprises the steps of:
    irradiating simultaneously a plurality of samples of a material with high energy nuclear particles where at least one of the samples contains an unknown amount of a transmutable material to be determined and a reference sample which contains a known amount of said material;
    moving said samples during irradiation with respect to the source of the nuclear particles in a manner to produce an essentially uniform irradiation of the samples which comprises the simultaneous rotation of the known and unknown sample each about two axes;
    transferring said samples in predetermined timed sequence to a radiation detection means; and,
    counting the radiation emanating from each sample individually over a predetermined time interval.

2. The method of claim 1 wherein the samples are moved in identical spacial paths with relation to the source of the nuclear particles during the irradiation step.

3. The method of claim 2 wherein the samples are rotated with respect to an axis external of each sample.

4. The method of claim 3 wherein the samples are concurrently rotated about an axis of symmetry thereof.

5. The method of claim 3 wherein the samples are rotated in a plane substantially parallel to the nuclear source target surface.

6. The method according to claim 1 wherein said method includes transferring the unknown sample immediately following the irradiation thereof to the detection means, detecing the radiation count thereof for a predetermined time interva ejecting the unknown sample from the detection means and transferring the reference sample to the detection means and detecting the radiation count thereof for a predetermined time interval after the elapse of a predetermined time interval, the length of which is greater than the transfer time required for transport of the reference sample from the irradiation means to the detection means.

7. The method according to claim 1 wherein said method includes simultaneously transferring the unknown sample to the detection means and transferring the reference sample to a position intermediate the irradiation and detection means, detecting the radiation count of this unknown sample for a predetermined time interval, ejecting the unknown sample from the detection means and simultaneously transferring said known sample from the intermediate position to said detection means.

8. The method of obtaining uniform irradiation of at least two samples in a neutron activation analysis system comprising the steps of:
    positioning the samples in juxtaposed ralation to each other in a movable head to follow identical spacial paths during rotation thereof;
    subjecting said head to a field of high energy neutron flux; and,
    simultaneously moving said head and the contained samples each about two axes such that the spacial paths are in a plane substantially parallel to the nuclear particle source target surface and wherein the two axes of rotation of each sample are in a non-coplanar relation.

9. The method of claim 8 wherein the samples are concurrently rotated about an axis of symmetry thereof.

10. An activation analysis system for the activation analysis of unknown materials which comprises the combination of
    a source producing a flux of high energy nuclear radiation;
    a rotatable irradiate head positioned in close proximity to said source and adapted to releasably receive a reference sample containing a known amount of the material to be analyzed for said at least one unknown sample containing an unknown amount of the material;
    means operatively connected to said head to rotate same and the samples along identical spacial paths through the flux of high energy nuclear radiation and to simultaneously rotate each sample about two axes which axes are in a non-coplanar relation;
    detection means adapted to detect and count the radiations emanating from a sample; and
    transfer means adapted to eject and transport said unknown and reference samples sequentially from the irradiate head to the detection means.

11. A system according to claim 10 wherein the irradiate head has a rotary portion having sample receiving chambers therein positioned in spaced relation to either side of the axis of rotation with the path of said chambers and contained samples being spacially identical with respect to the radiation source on rotation of said head.

12. The system of claim 11 wherein the sample receiving chambers include sample holding means rotatably mounted in said rotatable irradiate head for concurrent rotation about an axis of symmetry of the holding means on rotation of said head.

13. An activation analysis system which comprises in combination a source of high energy radation;

an irradiate head positioned in immediate proximity to said source and adapted to releasably receive a plurality of samples to be irradiated;

radiation detection means located remote of said irradiate head; and, transfer means interconnecting said irradiate means and said radiation detection means, wherein the irradiate head includes a movable portion thereof mounted for rotary movement, motor means operatively connected to rotate said rotary portion, sample receiving chambers positioned in said movable portion in spaced relation to either side of the axis of rotation and sample holding means rotatably mounted in said sample receiving chambers for rotation of each sample about an axis of symmetry thereof concurrently with the rotary movement of the movable portion and, the transfer means includes pneumatic sample transfer tubes interconnecting the sample receiving chambers of the irradiate head with the detection means, a source of gas under pressure, and valve means connecting said gas source with the sample receiving chambers of said irradiate head to selectively eject and transfer samples from said head to said detection means.

14. In an activation analysis system, a sample irradiation head which comprises a casing, a movable portion mounted in said casing for rotary movement, drive means operatively connected to drive said movable portion, said rotary portion containing sample receiving chambers therein positioned in side-by-side spaced relation to either side of the axis of rotation of said rotary portion, sample holding means positioned within the sample receiving chambers and mounted for rotational movement thereof and a held sample about an axis of rotation which is substantially normal to the axis of rotation of said rotary portion and means mounted on said casing and said movable portion responsive to the relative movement thereof to impart concurrent rotation to said sample holding means.

15. A system according to claim 14 wherein the sample holding means is provided with a tapered end portion adapted to mate with and frictionally engage the sample to hold same.

16. A system according to claim 15 wherein the sample holding means includes an opening in the end of the tapered end portion through which gas may be introduced to forcibly eject a sample from the sample holder.

17. A method of activation analysis according to claim 6 wherein the unknown and reference samples are moved through identical spacial paths while the count thereof is being detected by the detection means.

18. An activation analysis system according to claim 10 which further includes a rotatable detection head adapted to support and rotate the transferred samples at the detection means through identical spacial paths.

19. In an activation analysis system, a sample irradiate head adapted to receive a reference sample containing a known amount of material to be analyzed for and at least one unknown sample containing an unknown amount of the material to be analyzed for, and means operatively connected to said head to rotate same and the samples contained therein along identical spacial paths and to simultaneously rotate each sample about two axes which axes are in a non-coplanar relation.

References Cited

UNITED STATES PATENTS 3,025,400  3/1962  Schultz _____ 250—106 X

OTHER REFERENCES

Determination of Oxygen by 14 mev. Neutron Activation Analysis Using a New Analytical Instrument, by Fujii et al., from Journal of Atomic Energy Soc. of Japan, vol. 5, No. 6, June 1963; pp. 45–461.

A Rapid Method for the Direct Determination of Elemental Oxygen by Activation With Fast Neutrons, by Veal et al., from Analytical Chemistry, vol. 34, No. 2, February 1962; pp. 178–184.

ARCHIE R. BORCHELT, *Primary Examiner.*

U.S. Cl. X.R.

250—83.1, 106